(12) United States Patent
Zhu et al.

(10) Patent No.: US 7,263,080 B1
(45) Date of Patent: Aug. 28, 2007

(54) ARCHITECTURE OF AN INTEGRATED CIRCUIT FOR STREAMING MEDIA OVER WIRELESS NETWORKS

(75) Inventors: Robin Yubin Zhu, Fremont, CA (US); Chung-Hsing Chang, Milpitas, CA (US); Ted Hsiung, Saratoga, CA (US)

(73) Assignee: RDW, Inc., Milpitas, CA (US)

( * ) Notice: Subject to any disclaimer, the term of this patent is extended or adjusted under 35 U.S.C. 154(b) by 0 days.

(21) Appl. No.: 11/279,881

(22) Filed: Apr. 15, 2006

(51) Int. Cl.
*H04Q 7/00* (2006.01)

(52) U.S. Cl. ............... 370/328; 370/337; 370/348; 370/338; 370/442; 370/329; 375/262; 375/275; 375/354; 704/260; 704/265

(58) Field of Classification Search ........... 370/348, 370/337, 328, 474; 375/354, 360; 711/104
See application file for complete search history.

(56) References Cited

U.S. PATENT DOCUMENTS

| | | | | |
|---|---|---|---|---|
| 5,978,835 A | * | 11/1999 | Ludwig et al. | 709/204 |
| 6,031,825 A | * | 2/2000 | Kaikuranta et al. | 370/296 |
| 6,122,617 A | * | 9/2000 | Tjaden | 704/260 |
| 6,266,350 B1 | * | 7/2001 | Ojard et al. | 370/526 |
| 6,437,818 B1 | * | 8/2002 | Ludwig et al. | 348/14.09 |
| 6,681,287 B2 | * | 1/2004 | Chan | 711/104 |
| 6,826,173 B1 | * | 11/2004 | Kung et al. | 370/352 |
| 6,898,620 B1 | * | 5/2005 | Ludwig et al. | 709/204 |
| 6,920,528 B1 | * | 7/2005 | Chan | 711/115 |
| 7,054,313 B1 | * | 5/2006 | Gerszberg et al. | 370/390 |
| 7,184,428 B1 | * | 2/2007 | Gerszberg et al. | 370/352 |

* cited by examiner

*Primary Examiner*—Marceau Milord
(74) *Attorney, Agent, or Firm*—Joe Zheng

(57) ABSTRACT

An integrated circuit for streaming media over wireless networks is disclosed. The integrated circuit includes a media module that is designed to process media data. When non-media data is in, switching means is provided to avoid the non-media data being processed in the media module. One of important features in the integrated circuit is the underlying designs that are capable of facilitating wireless communication in different wireless networks. In one embodiment, a baseband processor is provided to facilitate wireless communications in more than one standard. The baseband processor is uniquely designed to facilitate wireless communications in a Wi-Fi network as well as a WiMAX network. As a result, same chips may be used to stream media data across different wireless networks.

19 Claims, 5 Drawing Sheets

ARCHITECTURE OF AN INTEGRATED CIRCUIT FOR STREAMING MEDIA OVER WIRELESS NETWORKS

BACKGROUND OF THE INVENTION

1. Field of the Invention

The present invention is related to the area of integrated circuit designs. More particularly, the present invention is related to architecture of an integrated circuit for streaming media over different wireless networks.

2. Description of the Related Art

Wireless network is becoming more and more popular with the introduction of various wireless devices. One of the important applications is the distribution of media data over a wireless network. The media data may include news, various footage, pictures, and up-to-date data in the form of video and/or audio.

To facilitate the exchange of media data between two devices, a common practice is to provide a media chip that is coupled to a baseband processor that is further coupled to a RF chip. As a result, a PC board in a wireless device is often employed with multiple chips. Not only is the high cost associated with such multiple chips on a board, but different wireless standards can lead to different designs of the board, incurring high cost in engineering and extending the development cycle.

It is well known that there are many wireless standards or protocols being adopted to facilitate wireless communication between devices. Examples of such standards include 806.11a, 806.11b, 806.11 g, 802.16d and 802.16e. Depending on actual applications, it is not possible to conclude one standard is better than another standard. To make a wireless device capable of communicating in more than one wireless standard, it would be desirable to integrate a number of baseband chips, each supporting one wireless standard. However, such solution would be costly and may increase the complexity of the wireless device.

There is, thus, a need for an integrated circuit architecture that integrates media functions and wireless functions provided in more than one standard by using common functional blocks so that the resultant chips can support media applications in more than one wireless standard without significantly increasing the design complexity of the chips as well as the devices.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention The invention pertains to an architecture of an integrated circuit for streaming media over wireless networks. According to one aspect of the present invention, the integrated circuit includes a media module that is designed to process media data. When non-media data is in, switching means is provided to avoid the non-media data being processed in the media module. One of important features in the present invention is the underlying designs that are capable of facilitating wireless communication in different wireless networks. According to another aspect of the present invention, a baseband processor is provided to facilitate wireless communications in more than one standard. According to still another aspect of the present invention, the baseband processor is uniquely designed to facilitate wireless communications in a Wi-Fi network as well as a WiMAX network. As a result, same chips may be used in a relay station, also referred to herein a mini basestation, that bridges a WiMAX network and a Wi-Fi network. The same chips may also be used in a pure WiMAX network as well as a pure WiFi network.

The present invention may be implemented as an integrated circuit, an apparatus or a part of a system. According to one embodiment, the present invention is an integrated circuit comprising a baseband processor capable of facilitating wireless communication in accordance with different wireless standards, a media module designed for processing media data that is coupled to or from the baseband processor; and switching means for avoiding non-media data being processed in the media module. The baseband processor comprises a plurality of functional blocks to process receiving signals or transmitting signals, and a mode controller configured to control at least one of the functional blocks so the baseband processor performs to facilitate wireless communications in more than one wireless communication standards.

The mode controller receives a set of parameters, in one embodiment, from a memory in responding to a setting by a user to determine which mode the integrated circuit shall be operating. In another embodiment, the mode controller is configured to determine automatically which mode the integrated circuit shall be operating in responding to what type of signal is being received.

The foregoing and other objects, features and advantages of the invention will become more apparent from the following detailed description of a preferred embodiment, which proceeds with reference to the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
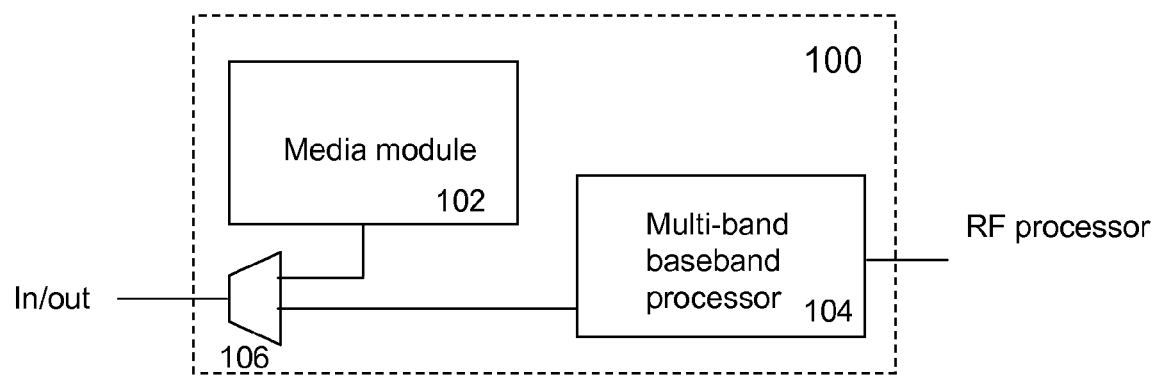
FIG. 1 shows an architecture of an integrated circuit for streaming media over different wireless networks in accordance with one embodiment of the present invention.

Referring now to the drawings, in which like numerals refer to like parts throughout the several views. FIG. 1 shows an architecture 100 of an integrated circuit for streaming media over different wireless networks in accordance with one embodiment of the present invention. The architecture 100 integrates a media module 102 providing codec functions and a multi-band baseband processor 104 capable of facilitating wireless communications in more than one wireless standard. The architecture 100 also includes a module 106 (e.g., a MUX) providing a switching function of selecting media data or non-media data. In general, the media data (e.g., video) means that the data needs to be processed via the media module 102 while the non-media data (e.g., messaging) means that the data does not go through the media module 102.

In operation, media data to be transmitted is received at the module 106 that is configured to direct the media data to the media module 102 for processing before the media data reaches the baseband processor 104. When non-media to be transmitted is received at the module 106 that is configured to direct the non-media data directly to the baseband processor 104.

Figure 2A:
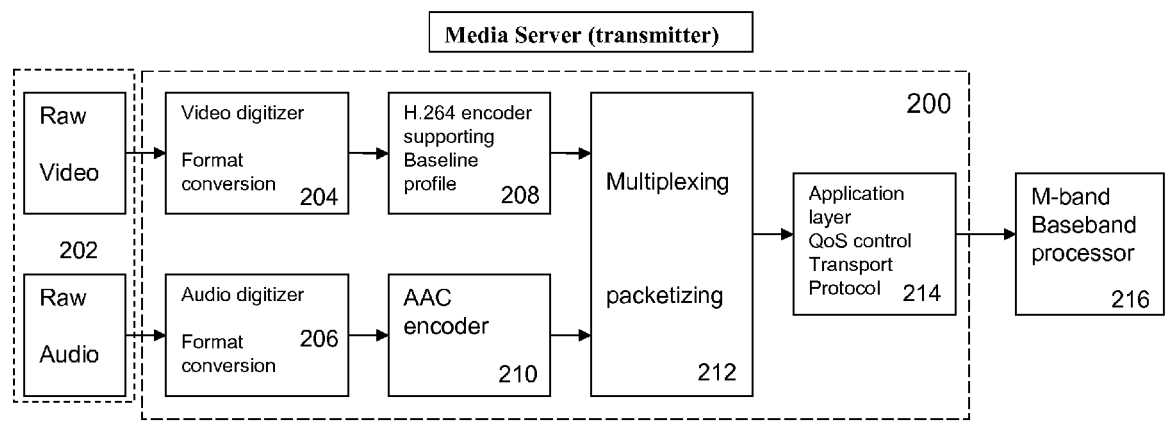
FIG. 2A shows a functional block diagram of a media module of FIG. 1 in a transmitting mode.

FIG. 2A shows a functional block diagram 200 of the media module 102 in a transmitting mode. Raw video and audio signal 202 (e.g., composite, component, or DVI format) is respectively coupled to a video digitizer 204 and an audio digitizer 206. The digitized video signal is coupled to a video encoder 208 (e.g., an H.264 encoder) that produces compressed video data. The digitized audio signal is coupled to an audio encoder 210 (e.g., Advanced Audio Coding (AAC)) that produces compressed audio data. The compressed video and audio data is then coupled to the multiplexing and packetizing unit when the compressed video and audio signals are multiplexed and packetized in a packetizing unit 212 based on, for example, the MPEG4 standard. Subsequently, the packetized audio/video stream is processed in an application specific QoS control processing unit 214 and the baseband processor 216 before being transmitted over a wireless network, such as a Wi-Fi or a WiMax wireless network.

Figure 2B:
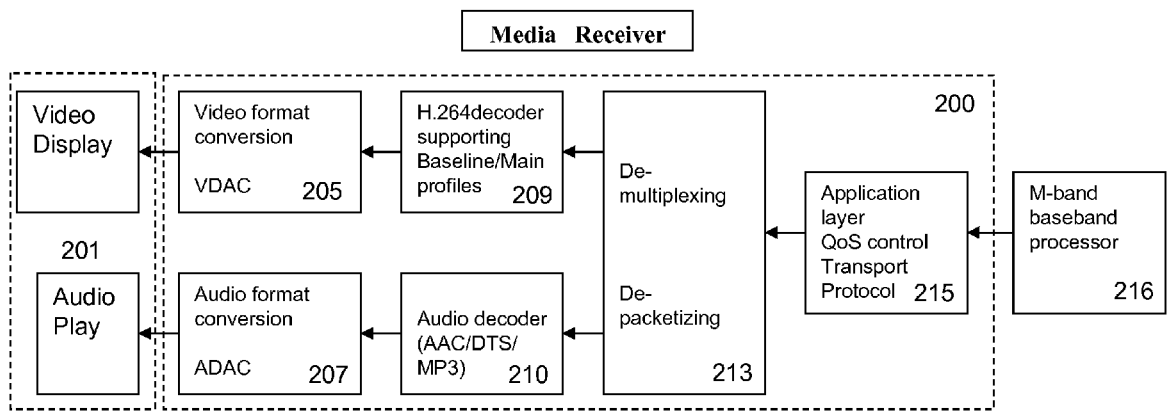
FIG. 2B shows a functional block diagram of a media module of FIG. 1 in a receiving mode.

FIG. 2B shows a functional block diagram 220 of the media module 102 in a receiving mode. For illustration, each of the functional blocks 204, 206, 208, 210, 212 and 214 of FIG. 2A is renamed in FIG. 2B as functional blocks 205, 207, 209, 212, 213 and 215. It is assumed that the output from the baseband process 216 pertains to media data. In operation, data from the baseband processor 216 goes through an application specific QoS control processing unit 215. The data is then demultiplexed and depacketized in a depacketizing unit 213. A video decoder 209 and an audio decoder 211 are applied to the data to recover the digital video signal and the digital audio signal. The video DAC 205 and audio 207 are provided to recover the video and audio signals from the digital video signal and the digital audio signal, respectively. A terminal device 201 with a video display and an audio player is provided to show the video and reproduce the audio.

One of the features in the present invention is that the architecture shown in FIG. 1 is capable of communicating media data across more than one type of wireless network. According to one embodiment, the baseband processor 104 is designed to be adaptive, either manually or automatically, to a wireless network. To facilitate the description of the present invention, two types of wireless networks, Wi-Fi and WiMAX, are considered.

Wi-Fi (or Wi-fi, WiFi, Wifi, wifi), short for "Wireless Fidelity", is a set of product compatibility standards for wireless local area networks (WLAN) based on the IEEE 802.11 specifications. New standards beyond the 802.11 specifications, such as IEEE 802.16, are currently in the works and offer many enhancements, anywhere from longer range to greater transfer speeds. Wi-Fi is intended to be used for mobile devices and LANs, but is now often used for Internet access. It enables a person with a wireless-enabled computer or personal digital assistant (PDA) to be connected to the Internet when in proximity of an access point. The geographical region covered by one or several access points is called a hotspot.

WiMAX, based on the IEEE 802.16-2004 Air Interface Standard is rapidly proving itself as a technology that will play a key role in fixed broadband wireless metropolitan area networks. It is a broadband wireless solution that enables convergence of mobile and fixed broadband networks through a common wide area broadband radio access technology and flexible network architecture.

Figure 3A:
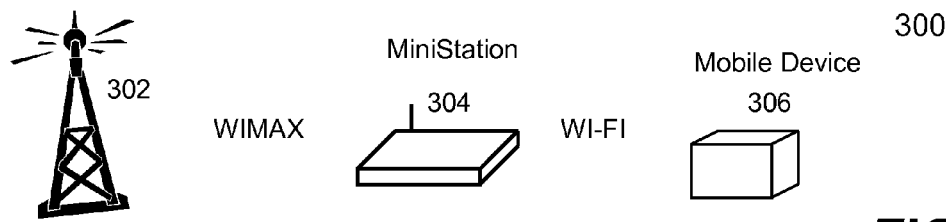
FIG. 3A shows a configuration in which a wireless service infrastructure (e.g., a wireless service provider or an antenna) provides WiMAX services while a mobile device is not ready to receive the WiMAX services and can only receive Wi-Fi services.

It is now commonly understood that Wi-Fi and WiMAX provide respective unique solutions. As a result, there are individual chips supporting Wi-Fi only as well as chips supporting WiMAX only. However, there are cases in which Wi-Fi and WiMAX are both needed to complement to each other. Referring to FIG. 3A, there shows a configuration 300 in which a wireless service infrastructure 302 (e.g., a wireless service provider or an antenna) provides WiMAX services while a mobile device 306 is not ready to receive the WiMAX services and can only receive Wi-Fi services. According to one embodiment of the present invention, a relay station 304, also referred to as a MiniStation, is provided to bridge the two different services.

A traditional design of the relay station 304 would employ at least two different chips, one configured to facilitate the wireless communication between the infrastructure 302 and the relay station 304, and the other to facilitate the wireless communication between the relay station 304 and the mobile device 306. The designs of the two different chips would take a longer engineering time and be complicated.

Figure 3B:
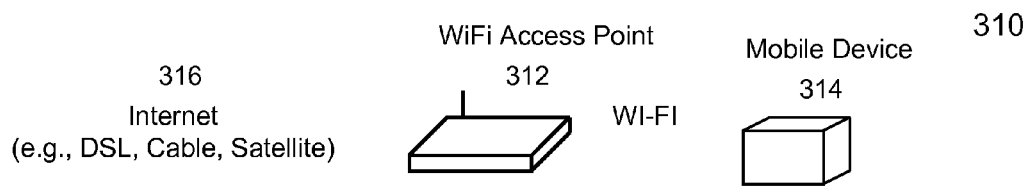
FIG. 3B and FIG. 3C, respectively, show two respective configurations in which a same chip designed in accordance with the present invention can be used.
Figure 3C:
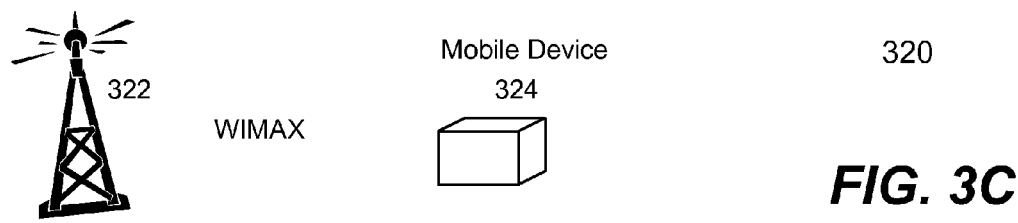

As will be detailed below, due to the unique architecture in the present invention, two identical chips are used to facilitate the wireless communication across two different technologies. The same chips may be used in the configurations 310 and 320, respectively shown in FIG. 3B and FIG. 3C. Both the Wi-Fi access point 312 and a mobile device 314 are equipped with the same chips. FIG. 3B shows that the Wi-Fi access point 312 is provided to connect the mobile device 314 to the Internet 316. Similarly, a mobile device 324 in FIG. 3C is equipped with the same chip. FIG. 3C shows that the mobile device 324 communicates with a WiMAX wireless service infrastructure 322.

Figure 4:
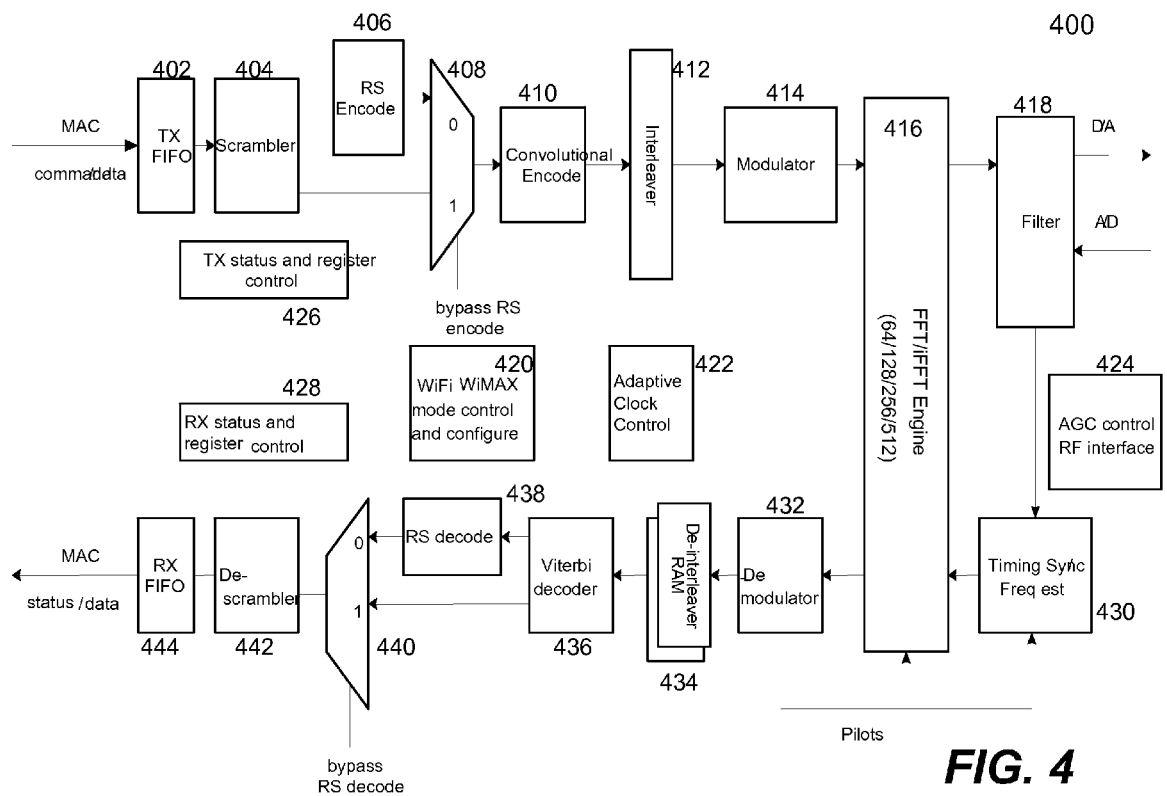
FIG. 4 shows a block diagram of an integrated circuit according to one embodiment of the present invention.

For completeness, FIG. 4 shows a block diagram of a bassband processor 400 that may be used as the baseband processor 104 of FIG. 1 or the baseband processor 216 of FIG. 2A or 2B according to one embodiment of the present invention. One of the key features in the bassband processor 400 is the ability of facilitating multiple wireless standards, for example, Wi-Fi and WiMAX. In other words, a same chip designed in accordance with the bassband processor 400 may be used for Wi-Fi communication, WiMAX communication or both.

To facilitate the understanding of the baseband processor 400, functions of transmitting and receiving are described respectively. As shown in FIG. 4, data to be transmitted out or exchanged with another device is coupled to a TX FIFO 402 via one or more media access controllers (MAC). The TX FIFO 402, a buffer designated for transmitting function, is provided to store a transmit command profile and the data. The command profile includes information needed for a baseband to process the data, such as the data length, data rate, subchannelization index, scrambler seed, etc.

In one embodiment, the TX FIFO 402 has a capacity of 128 words in depth and 10 bits in width. Two extra bits are tagged in front of the byte data from the MAC to delimit the burst boundary. At a predefined time, the baseband may be configured to fetch and interpret the command profile and parse the data to a predefined format accordingly. An example of the predefined format pertains to orthogonal frequency division multiplexing (OFDM).

The incoming data is then scrambled in a scrambler 404 to overcome the peak-to-average power ratio problem in the OFDM system. When the integrated circuit 400 operates in the WiMAX mode, the scrambled data goes through a Reed Solomon (RS) encoder 406 to add redundancy bytes for error correction. The output data from the RS encoder 406 is convolution-encoded in a convolution encoder 410. According to one aspect of the present invention, when the integrated circuit 400 operates in the Wi-Fi mode, the RS encoder 406 is not activated. The multiplexer (MUX) 408 is provided to take an output either from the RS encoder 406 or from the scrambler depending on which mode the integrated circuit 400 operates. According to one embodiment, the multiplexer (MUX) 410 is controlled by a signal in accordance with a mode controller 420.

The subsequent blocks including an interleaver 412 and modulator 414 are enabled based on the command profile. The output from the convolution encoder 410 is provided to an interleaver 412. Interleaving the encoded symbols from the convolution encoder 410 provides a form of time diversity to guard against localized corruption or bursts of errors. Since most the error correction codes are designed to correct the random errors, the interleaving is applied to randomize the occurrence of bit errors after the encoding.

The interleaved data from the interleaver 412 is then provided to a modulator 414 that modulates the interleaved data in BPSK, QPSK, 16 QAM or 64 QAM constellation representations. The modulated data is then sent to an FFT engine 416 for an inverse FFT operation. To support various modes, in one embodiment, the OFDM symbol size is run-time configurable, for example, from 64 to 512 points. The data is then provided to a filter 418 for filtering in the Wi-Fi mode or proper sampling rate conversion in the WiMAX mode to meet a specific bandwidth requirement set by, for example, a government agency. The output from the filter is then provided to a D/A converter for transmission.

It should be noted that a mode controller 420 is provided to control the operation mode of the baseband processor 400. The mode controller 420 receives a set of parameters, in one embodiment, from a memory in responding to a setting by a user to determine which mode the baseband processor 400 shall be operating. In another embodiment, the mode controller 420 is configured to determine automatically which mode the baseband processor 400 shall be operating in responding to what type of signal is being received.

An adaptive clock control block 422 is provided; the clock rate at which many functional blocks as described above operate is adaptively selected for different bandwidth to achieve a lower power consumption. A automatic gain control (AGC) block 424 is provided to control the RF interface, for example, to operate in link-based mode (suitable for WiMAX) or packet-based (suitable for Wi-Fi).

As also shown in FIG. 4, when a signal is received, the received signal is digitized via an A/D converter. It should be noted that, in one embodiment, the AGC block 424 is implemented according to a hybrid automatic gain control scheme to adjust a gain in RF adaptively. The timing sync/freq estimation block 430 is used to decide the symbol boundary and estimate the frequency offset. The estimation block 430 is capable of detecting various preamble patterns defined in both standards of Wi-Fi (e.g., 802.11a/b/g) and WiMAX (e.g., 802.16d/e) by performing auto-correlation and cross-correlation with a dynamically scalable moving average window on the incoming RX signals.

The digitized signal is then filtered in the FFT engine 416 for a forward FFT operation. The output from the FFT engine 416 is provided to a De-modulator 432 that performs an inverse operation of the modulator 414. A De-interleaver 414 including a RAM with a predefined capacity receives the demodulated signal from the De-modulator 432 and de-interleaves the signal.

A Viterbi decoder 436 also performs the inverse operation of the convolution encoder 410. Depending on the operating mode, the output from the Viterbi decoder 436 is coupled to a De-scrambler 442 directly or via a RS decoder 438, which is controlled by a multiplexer (MUX) 440 in response to the mode controller 420. A De-scrambler 442 is provided to unscramble the signal from the MUX 440. Subsequently data is recovered and sent to a receiving device via a receiving FIFO 444.

It should be noted that the transmitting and receiving functions have been described respectively. Those skilled in the art that the implementations of the functions blocks in the transmitting and receiving path are not necessarily implemented independently. Some of the functions blocks can be readily controlled to perform either a forward or an inverse operation. For example, a RS codec can be configured to perform both encoding and decoding. Likewise, a scrambler, an interleaver and a modulator can be configured to perform both scrambling, intervleaving, modulating, and unscrambling, de-intervleaving, de-modulating.

One of the features in the present invention is to provide an architecture capable of supporting at least two respective communication standards to facilitate communications. One of the benefits, advantages and features includes a smaller die size of chips so designed to be used in devices such as a transceiver, a portable device and a communication infrastructure.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the foregoing description of embodiments.

We claim:

1. An integrated circuit comprising: a baseband processor capable of facilitating wireless communication via a RF interface in more than one wireless standards, wherein the baseband processor includes a plurality of functional blocks to process signals that are received or to be transmitted; and a mode controller configured to control at least one of the functional blocks so the baseband processor performs to facilitate wireless communications in more than one wireless communication standards; a media module designed for processing media data that is coupled to or from the baseband processor; and switching means for avoiding non-media data being processed in the media module.

2. The integrated circuit as recited in claim 1, wherein the media module includes a codec that converts digitized video and audio signals to video and audio data according to a video standard.

3. The integrated circuit as recited in claim 2, wherein the video and audio data is processed in an application specific QoS control processing unit before being processed in the baseband processor.

4. The integrated circuit as recited in claim 1, wherein the media module includes a codec that converts video and audio data from the baseband processor to digitized video and audio signals according to a video standard.

5. The integrated circuit as recited in claim 4, wherein the video and audio data is processed in an application specific QoS control processing unit before being processed in the codec.

6. The integrated circuit as recited in claim 1, wherein the mode controller is configured to provide a first mode and a second mode, the integrated circuit supports Wi-Fi communication when the mode controller commands the first mode, the integrated circuit supports WiMAX communication when the mode controller commands the second mode.

7. The integrated circuit as recited in claim 6, wherein the functional blocks includes a RS codec that is deactivated when the mode controller commands the first mode.

8. The integrated circuit as recited in claim 7, wherein the RS codec is coupled between a scrambler and a convolution encoder, but signals are coupled between the scrambler and the convolution encoder.

9. The integrated circuit as recited in claim 8, wherein a multiplexer is provided to ensure that signals are received from the scrambler.

10. The integrated circuit as recited in claim 6, wherein the functional blocks includes a RS codec that is activated when the mode controller commands the second mode.

11. The integrated circuit as recited in claim 10, wherein the RS codec is coupled between a scrambler and a convolution encoder, and signals are coupled from the RS codec to the convolution encoder.

12. The integrated circuit as recited in claim 11, wherein a multiplexer is provided to ensure that signals are received from the RS codec.

13. The integrated circuit as recited in claim 6, wherein the functional blocks include
   at least a FIFO buffer;
      a first circuit, coupled to the FIFO buffer, performing either scramblering or unscramblering;
      a second circuit performing either convolution encoding or Viterbi decoding;
      a RS codec coupled between the first circuit and the second circuit;
      a third circuit performing either interleaving or de-interleaving;
      a forth circuit performing either modulating or demodulating, wherein the third circuit couples the second circuit to the forth circuit;
      an FFT engine coupled to the firth circuit; and
      a filter to ensure outgoing signals compliant with a communication standard, and filter out unwanted signals from incoming signals.

14. The integrated circuit as recited in claim 13 further including an AGC control circuit to control an RF interface to ensure that integrated circuit operates in a link-based mode or a packet-based mode.

15. The integrated circuit as recited in claim 13, wherein the mode controller is configured to provide a first mode and a second mode, the integrated circuit supports Wi-Fi communication when the mode controller commands the first mode, the integrated circuit supports WiMAX communication when the mode controller commands the second mode.

16. The integrated circuit as recited in claim 15, wherein the RS codec is activated or deactivated in response to the mode controller.

17. The integrated circuit as recited in claim 16, wherein a multiplexer is used to select signals to facilitate the Wi-Fi communication or the WiMAX communication.

18. The integrated circuit as recited in claim 15, wherein the mode controller is provided to control an operation mode of the integrated circuit, the mode controller receives a set of parameters from a memory in responding to a setting by a user to determine which mode the integrated circuit shall be operating.

19. The integrated circuit as recited in claim 15, wherein the mode controller is provided to control an operation mode of the integrated circuit, the mode controller is configured to determine automatically which mode the integrated circuit shall be operating in responding to what type of signals is being received.

* * * * *